J. C. DOUBT.
SCREW HOLDING SCREW DRIVER.
APPLICATION FILED FEB. 3, 1916.
1,206,097.
Patented Nov. 28, 1916.
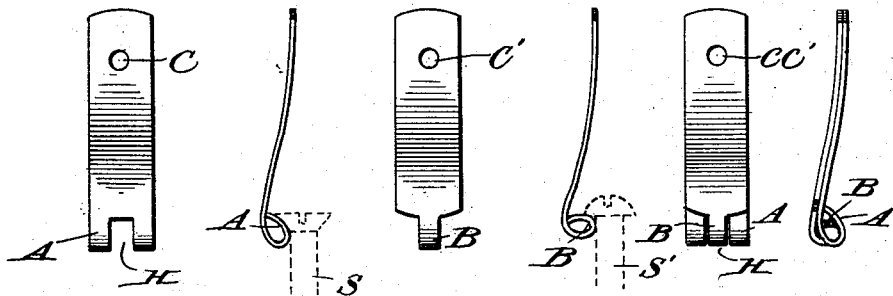
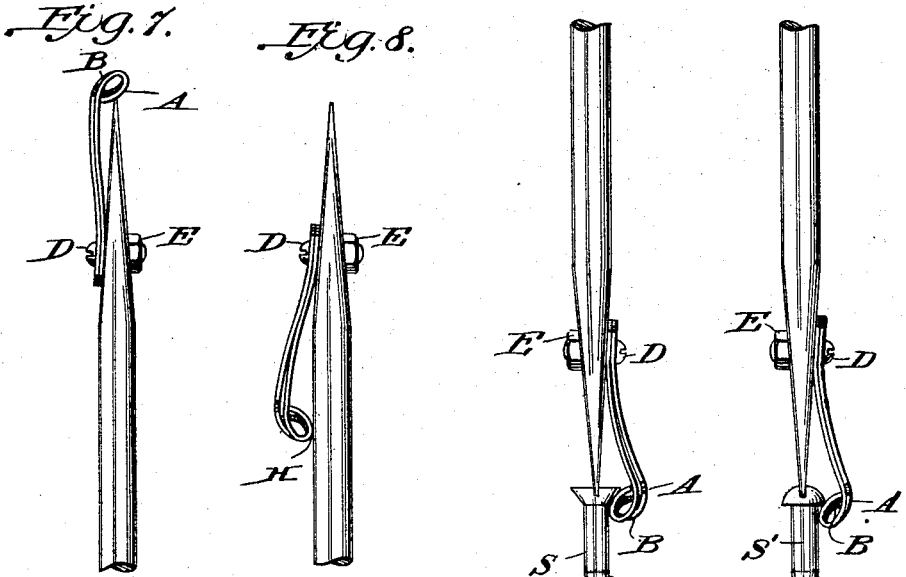
Witnesses
Eva W. Doubt
G. H. Young
Inventor:
John C. Doubt

UNITED STATES PATENT OFFICE.

JOHN C. DOUBT, OF SEATTLE, WASHINGTON.

SCREW-HOLDING SCREW-DRIVER.

1,206,097.    Specification of Letters Patent.    Patented Nov. 28, 1916.

Application filed February 3, 1916. Serial No. 76,051.

*To all whom it may concern:*

Be it known that I, JOHN C. DOUBT, a citizen of the United States, residing at Seattle, in the county of King and State of Washington, have invented a new and useful Screw-Holding Screw-Driver, of which the following is a specification.

Throughout these specifications and claim the word screwdriver is intended to include screwdriver bits, bit screwdrivers, and all other screwdrivers which operate by means of an edge which engages a groove in the head of the screw; the term top or under side of a screw head refers to that side respectively which is the top or under side when the point of the screw is downward; the term clip refers to the complete invention or to one of its constituent parts which is capable of or adapted to independent and separate use as herein set forth.

My invention is a device or combination of devices attached or to be attached to or made part of a screwdriver for the purpose of conveniently clamping a screw at will in position to drive. Its advantages are that by its use a mechanic is enabled, (1) to set a screw with one hand while using the other hand to hold an article in position to receive the screw, as for instance on wall or ceiling; (2) to use both hands on the screwdriver, when starting the screw; (3) to set a screw in a position inaccessible to the fingers; (4) to better secure special or irreplaceable machine screws or other screws from danger of being dropped and lost when being started.

My invention is illustrated in the accompanying drawings, in which—

Figure 1 is a flat view and Fig. 2 an edge view of a spring, the dotted lines in Fig. 2 indicating a screw head; Fig. 3 is a flat view and Fig. 4 an edge view of another spring, the dotted lines in Fig. 4 indicating another screw head; Fig. 5 is a flat view and Fig. 6 an edge view of the two preceding springs combined, or one superposed upon the other; Fig. 7 is an edge view of the same as Fig. 6 with screwdriver attached; Fig. 8 is the same as Fig. 7 with springs in a different position; Fig. 9 is the same as Fig. 7 with a flat head screw clamped in position to drive; Fig. 10 is the same as Fig. 7 with a round head screw clamped in position to drive.

Similar letters refer to similar parts throughout the several views.

The spring shown in Figs. 1 and 2 is preferably of flat steel. C is a hole through the spring by means of which and a corresponding hole through the screwdriver the spring is attached flat against the flattened portion of the screwdriver, preferably by machine screw D, shown in Fig. 7, with nut E riveted on, or attachment may be by rivet or bolt and nut. The nut is adjusted to be sufficiently tight to hold the spring by friction in any position in which the spring may be placed by rotation upon the machine screw D as an axis. The essential feature of this spring is a contact surface A which, when the spring is attached as described, shall stand at an angle to the longitudinal direction of the screwdriver of approximately forty-five degrees, that is to say, approximately the complement of the angle of about one hundred thirty-five degrees which the shank S of a flat head screw makes with the under surface of the screw head, as seen in Fig. 2. This angle is the same for all sizes of flat head screws. Accordingly, when a flat head screw is inserted between the contact surface A and the edge of the screwdriver, the profile of the under side of the screw head should coincide with the profile of the contact surface A along a straight line. H however is a slot through the contact surface A and the supporting spring in consequence of which the contact surface A, instead of meeting the screw head along one line, meets it along two lines, one along either side of the slot H.

The flat contact surface A is obtained in the case of the spring illustrated in the drawings by means of re-curving or rolling the flat steel spring in such a way that it presents a flat surface in the desired direction. The surface A may however equally well be secured by other means, as for instance by a simple projection, hook, turn, flange, or shoulder of the spring, or by means of any piece of metal suitably formed and riveted or otherwise attached to the spring so as to present a contact surface in the desired direction.

When a flat head screw head is inserted between the contact surface A of this spring and the edge of the attached screwdriver, the tension of the spring exerted against the under side of the screw head first clamps the screw groove tightly against the edge of the screwdriver, then acting upon the screwdriver edge as an axis, revolves the screw head into coincidence with the contact surface A along the two lines of contact hereinbefore described; because if the two surfaces do not so coincide, there is unstable equilibrium through an unbalanced tension of the spring exerted along all points of the two lines not in coincidence. The tension of the spring when the screw head is inserted also increases the friction resulting from rotation of the spring when it is revolved upon the machine screw D as an axis, this increased friction resulting in increased stability of the spring and screw, through the fact that the two lines of contact of the spring with the screw head are necessarily upon partly opposed sides of the screw head, thereby tending to prevent lateral displacement of the screw head by sliding of the groove along the edge of the screwdriver. Since the ends of the screwdriver edge are farther from the pivot D than the center of the screwdriver edge, lateral displacement is further opposed by the resiliency of the spring and the consequently increased friction upon the pivot D caused by such displacement. When the groove of the screw is thus held in correspondence with the edge of the screwdriver and the contact surface A is brought into coincidence with the under surface of the screw head, the screw is necessarily clamped in the correct position to drive. This spring, attached to a screwdriver as described, is adapted for independent use as a screw-clip for the purpose of conveniently clamping screws of the flat-head type only, at will, in position to drive. It is, however, primarily designed for use with and intended to be used in combination with the spring illustrated in Figs. 3 and 4. The spring illustrated in Figs. 1 and 2 will hereinafter be referred to as the flat-head spring or clip, while the spring illustrated in Figs. 3 and 4 will be referred to as the round-head spring.

The round-head spring is preferably of the same material hereinbefore described as the flat-head spring, and is attached to the screwdriver by similar means and adjustments of the nut E. The essential feature of the round-head spring, and the feature which differentiates it from the flat-head spring is a contact surface B, which, when the spring is attached to the screwdriver, stands approximately at a right angle to the longitudinal direction of the screw-driver, thereby corresponding approximately to the angle which the shank S' of a round head screw makes with the flat under side of the screw head. Accordingly, when a round head screw head is inserted between the contact surface B and the edge of the screwdriver, the contact surface B conforms to the flat under-side of the screw head, and the tension of the spring clamps the screw into the position to drive by action substantially corresponding to that hereinbefore set forth by which the flat-head spring clamps the flat head screw in the driving position.

The round-head spring is designed for use in combination with the flat-head spring, the said combination being illustrated in Figs. 5 and 6. For purposes of combination the contact surface B and the supporting spring are made narrow enough to slip easily through the slot H of the flat-head spring, and long enough to extend somewhat beyond the contact surface A, as illustrated in Fig. 6. With the two springs fitted flat together, the holes C and C' corresponding, and contact surface B extending through the slot H as above described, the two springs combined are attached to the screwdriver by the same means and adjustments as either one separately as hereinbefore described, the flat-head spring nearest the screwdriver. When so attached to the screw driver the combination of the two springs will clamp in the driving position either flat head or round head screws at will, the flat-head screw being clamped by the flat-head spring substantially as though the round-head spring were not present, the contact surface B being pushed back through the slot H by the conical under side of the screw head, to the position illustrated in Fig. 9. The tension of the round-head spring being then exerted only against one point of the screw, and that point about midway longitudinally of the screw head, is exerted almost directly against the edge of the screw-driver and does not alter the position of the screw as determined by the flat-head spring but merely reinforces and strengthens the action of that spring. Likewise, in the combination of springs, a round-head screw is clamped by the round-head spring substantially as though the flat-head spring were not present. The contact surface B extending beyond the contact surface A as hereinbefore specified, first engages the under side of the screw head and clamps it, while contact surface A of the other spring touches the screw in only four points, two on the rim of the head on partly opposed sides, the other two on the shank below the head on partly opposed sides, as illustrated in Fig. 10. The pressure of the spring exerted against these four points, two above and two below the screwdriver edge, counterbalances itself; and while the round-head spring determines the position of the screw, the tension of other spring reinforces and strengthens the action of the round-head spring; and the pressure upon the four points, being upon partly opposed sides of the screw, acts to prevent lateral displacement of the screw head by sliding of the groove upon the screw-driver edge.

In attaching the combination of the two springs to the screwdriver, the round-head spring may be used nearest the screwdriver instead of the flat-head spring by merely reversing the slotting and narrowing or the two contact surfaces and springs, that is to say, by making the slot H in the round-head spring instead of in the flat-head spring, and narrowing the contact surface A instead of the contact surface B to fit the slot. As so reversed, Fig. 1 will represent a flat view and Fig. 4 an edge view of the round-head spring. In this round-head spring as altered the contact surface B, naturally, would be the full width of the spring at other portions as shown in Fig. 1. Either the round-head spring as illustrated in Figs. 3 and 4, or the round-head spring as illustrated in Figs. 1 and 4, preferably the latter, are adapted for independent use as a screw-clip for the purpose of conveniently clamping screws of the round-head type only, at will, in position to drive. They are however designed primarily for use with and are intended to be in combination with a flat-head spring as specified. Also I do not wish to be limited in the use of my invention to the use of two springs in combination and no more, inasmuch as it is obvious that more than two springs can be combined according to the same principles and to secure the same results. Both the round-head clip and the flat-head clip and the combination clip and all clips herein referred to release the screw in the same manner, to wit, by revolution of the screw and clip upon the machine screw D as an axis. This rotation occurs automatically when the material into which the screw is being driven comes into contact with the clip. Such rotation also may be made to occur earlier in the driving of the screw, at will, by giving the screwdriver a suitable side-long jerk. When not desired the clip may be rotated to the position of non-use illustrated in Fig. 8, where the clip is retained in position by engagement of the slot H with the screwdriver, thus keeping the clip out of the way and permitting use of the screwdriver substantially as without the clip.

I claim as my invention:

The combination in a screwdriver of a shank having duplicate, superimposed spring clips attached thereto, one of said clips being slotted and provided with contact surface for engagement with screw heads of one shape, and the other clip having a reduced contact surface occupying the slot of the first mentioned clip, for engaging the heads of screws of a different shape.

JOHN C. DOUBT.

Witnesses:
 Eva W. Doubt,
 O. B. Root.

Copies of this patent may be obtained for five cents each, by addressing the "Commissioner of Patents, Washington, D. C."